UNITED STATES PATENT OFFICE.

CHARLES HERENDEEN, OF CHICAGO, ILLINOIS.

FLOUR.

958,496. Specification of Letters Patent. Patented May 17, 1910.

No Drawing. Application filed February 14, 1910. Serial No. 543,652.

*To all whom it may concern:*

Be it known that I, CHARLES HERENDEEN, a citizen of the United States, residing at Chicago, in the county of Cook and State of Illinois, have invented certain new and useful Improvements in Flour, of which the following is a specification.

My invention relates to an improved flour, and it has for its object the production of a flour which is capable of absorbing and retaining more moisture than the flour of ordinary manufacture, and one in the use of which there is a marked resulting economy in the amount of yeast or other leavening medium required to be employed therewith, as well as a material saving in the quantity of shortening and sugar necessary in the making of bread, pastry, or other baker's products made therefrom.

To these ends my improved flour consists of a mixture of a quantity of flour in which the starch cells have been ruptured, with a larger quantity of flour in which the starch cells have not been ruptured.

In the production of my flour I take meal, flour or grits, either coarse or fine, which may be of wheat, corn, rye or other cereals having a high starch content, and place the same in a suitable container into which steam is injected for a sufficient period, conditioned upon the quantity of the mass to be treated, to open up and disrupt the starch cells therein and moisten the mass. The material is subjected to the action of the steam but for a limited period, to avoid cooking, which period I have found need not exceed thirty seconds of time. The material then treated is passed between cold rolls which serve to compress the mass and which, after passing through such rolls, breaks up into light flaky particles, and which, in their passage from these rolls, become sufficiently dry by exposure to the atmosphere or, if it be found necessary, can be run through containers in which they may be subjected to a blast of air. These flakes in their dry condition are then passed between reducing rolls and ground into flour of any desired fineness. The resulting product is then combined in proportioned degree with ordinary wheat, graham, rye, or other flour prepared in the ordinary manner, and in the proportions of about from five to twenty-five pounds of my flour to one hundred pounds of flour prepared in the ordinary manner.

Another method which I may employ in producing my improved flour consists of the taking of flour, either coarse or fine, preferably however a flour prepared from white corn as containing a high percentage of starch, and the adding thereto of a sufficient amount of water to form a paste. This paste is then passed between hot rolls which roll it out into a very thin sheet and the action of the heat thereon causes the moisture which has been absorbed by the starch cells to burst the same. The heat from the rolls in addition to causing the disruption of the starch cells causes the evaporation of the moisture from the paste and it passes from the rolls in dry flakes or sheets.

The flakes or sheets produced by the above steps are then ground into flour, being preferably passed through what is ordinarily termed the full roller process. The flour thus produced is then combined with flour of ordinary manufacture and in the proportions hereinbefore set forth. I prefer, however, to use the first method described herein, or what I term the "cold roll" method of producing my improved flour, same being more economical.

I have found that the result of this mixture produces a product having high moisture absorbing properties and one from which bread, cakes, pastry, or other baker's products may be made which will be more palatable and nourishing as food and which will retain their freshness for a longer period. I have also found that with this mixture a larger proportion of the products can be produced from a given quantity thereof than is possible from flour prepared in the ordinary manner alone.

The flour produced by either of the herein recited methods does not differ in consistency or appearance from the flour prepared in the ordinary way, the sole difference being in the structure of the starch cells which have been disrupted and which therefore are opened out and capable of absorbing a very much greater amount of moisture than when in their normal condition.

Having thus described my invention what

I claim as new and desire to secure by Letters Patent is:

1. As a new article of manufacture, a flour, comprising a mixture of a quantity of flour in which the starch cells have been ruptured, with a larger quantity of flour in which the starch cells have not been ruptured.

2. As a new article of manufacture, a flour, comprising a mixture of a quantity of flour in which the starch cells have been ruptured, with a quantity of flour in which the starch cells have not been ruptured, in substantially the proportions set forth.

In testimony whereof I affix my signature in presence of two witnesses.

CHARLES HERENDEEN.

Witnesses:
L. PANKHURST,
MABEL PAULSEN.